United States Patent
Leopold, Jr. et al.

(10) Patent No.: US 8,213,102 B2
(45) Date of Patent: Jul. 3, 2012

(54) SYSTEMS AND METHODS FOR STORING DATA TO MAGNETIC TAPE HAVING DAMAGED AREAS

(75) Inventors: Perry Joseph Leopold, Jr., Round Rock, TX (US); John H. Dearlove, Sr., Harker Heights, TX (US); William Lindsay Theobald, Austin, TX (US); Michael Joseph Linane, III, Round Rock, TX (US); Dina Eldin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/034,432

(22) Filed: Feb. 24, 2011

(65) Prior Publication Data

US 2011/0141602 A1 Jun. 16, 2011

Related U.S. Application Data

(63) Continuation of application No. 12/243,541, filed on Oct. 1, 2008, now Pat. No. 7,898,758.

(51) Int. Cl.
*G11B 27/36* (2006.01)
(52) U.S. Cl. .............................. 360/31; 360/53; 360/55
(58) Field of Classification Search ........................ None
See application file for complete search history.

(56) References Cited

U.S. PATENT DOCUMENTS

| | | | |
|---|---|---|---|
| 3,753,835 A | 8/1973 | King | 156/506 |
| 4,385,959 A | 5/1983 | Goguen | 156/506 |
| 4,501,630 A | 2/1985 | Kiuchi | 156/159 |
| 5,332,167 A | 7/1994 | Sota | 242/527 |
| 5,369,532 A | 11/1994 | Dodt et al. | 360/48 |
| 6,381,706 B1 | 4/2002 | Zaczek | 714/5 |
| 6,557,141 B1 * | 4/2003 | Gill et al. | 714/771 |
| 6,898,036 B2 | 5/2005 | Gill et al. | 360/53 |
| 6,945,489 B2 | 9/2005 | Anderson et al. | 242/348 |
| 7,269,687 B2 * | 9/2007 | Edling et al. | 711/111 |
| 7,362,957 B2 * | 4/2008 | Tanaka et al. | 386/269 |

* cited by examiner

*Primary Examiner* — Jason Olson
(74) *Attorney, Agent, or Firm* — Baker Botts L.L.P.

(57) ABSTRACT

A method for using magnetic tape having damaged areas is disclosed. The method may include writing data to streaming magnetic tape, determining if the data write was successful, and responding to an unsuccessful data write by interrupting the data writing and advancing the magnetic tape forward a predetermined distance. Additionally, the method may include attempting to write data at the next location on the magnetic tape and determining if the data write was successful. The method may further include repeating the steps of advancing the tape, attempting to write, and determining whether the data write was successful following any determination that an attempted data write was not successful. The method may include further include resuming writing data to streaming magnetic tape at a location where a data write is determined to be successful.

20 Claims, 2 Drawing Sheets

SYSTEMS AND METHODS FOR STORING DATA TO MAGNETIC TAPE HAVING DAMAGED AREAS

CROSS-REFERENCE TO RELATED APPLICATIONS

This application is a continuation of U.S. patent application Ser. No. 12/243,541 filed Oct. 1, 2008, now U.S. Pat. No. 7,898,758 which is hereby incorporated in its entirety by reference.

TECHNICAL FIELD

The present disclosure relates in general to magnetic tapes for use in an information handling system, and more particularly to storing data to a magnetic tape having damaged areas.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Magnetic tape data storage devices are commonly used with information handling systems to write, read, and store data. Since its introduction over fifty years ago, magnetic tape has remained a popular data storage format despite the development of alternative media such as compact disks, USB flash drives, memory sticks, and others. One beneficial feature of magnetic tape is that it remains the most inexpensive and efficient means for storing or archiving large volumes of data. With advancing technology, high density magnetic tape has allowed for individual tape devices to provide increasingly greater data storage capacity. Further, large quantities of magnetic tape devices can be housed within automated tape libraries and serviced by shared read-write units, which allows for enhanced organization and rapid access of data. Additionally, magnetic tape allows for erasing and modifying data unlike many other media formats, such as read-only compact disks.

To increase the data storage capacity in high density tape devices, advancing technology has made it possible to utilize increasingly thinner magnetic tape in tape storage devices. However, such thin tape is often fragile, and thus susceptible to damage in the normal course of use. For example, edge damage, wrinkles, cupping, and compression creep are common with today's thinner tapes, despite the increased sophistication of tape paths and tension methods within tape drives.

Given the present methods by which tape drives read and write to magnetic tape, the likelihood of tape damage presents a drawback to storing data to tape. Currently, a write head writes data to magnetic tape and an error detection technique is then performed to determine whether the data write was successful. Any damage or defect in the magnetic tape may result in data corruption, whereby the tape drive may respond by issuing a soft write error and may then re-attempt to write the intended data. If the second attempt is unsuccessful, the tape drive may issue a hard write or fatal error message and may abort read-write operations. This may occur at the damaged location each time data is attempted to be written to the tape regardless of how minimal the damaged area is, or how much undamaged tape remains beyond the damaged area. Thus, based on current methods, many high capacity magnetic tape cartridges are rendered unusable, and often discarded, despite retaining a large amount of unused data storage capacity.

SUMMARY

In accordance with the teachings of the present disclosure, disadvantages and problems associated with writing data to magnetic tape having damaged areas have been substantially reduced or eliminated.

In accordance with one embodiment of the present disclosure, a method for using magnetic tape having one or more damaged areas is provided. The method may include writing data to streaming magnetic tape, determining if the data write was successful, and responding to an unsuccessful data write by interrupting the data writing and advancing the magnetic tape forward a predetermined distance. Additionally, the method may include attempting to write data at the next location on the magnetic tape and determining if the data write was successful. The method may further include repeating the steps of advancing the tape, attempting to write, and determining whether the data write was successful following any determination that an attempted data write was not successful. Furthermore, the method may include resuming writing data to streaming magnetic tape at a location where a data write is determined to be successful.

In accordance with another embodiment of the present disclosure, a tape drive for writing data to magnetic tape may include a tape head configured to write data, an error detection module configured to detect a data writing error, and a tape advancement module configured to interrupt data writing and advance the tape forward a predetermined distance to a next location on the magnetic tape in response to detecting a data writing error. Additionally, the tape head, the error detection module, and the tape advancement module may be configured to cooperate to repeat the functions of advancing the magnetic tape a predetermined distance, attempting to write data to the magnetic tape, and determining if the attempted data write was successful following each unsuccessful data writing attempt. Further, the tape head may be configured to continue to write data to the magnetic tape at an undamaged location.

In accordance with a further embodiment of the present disclosure, an information handling system may include a processor and a tape drive coupled to the processor. The information handling system may further include a tape drive including a tape head configured to write data, an error detection module configured to detect a data writing error, and a tape advancement module configured to interrupt data writing and advance the tape forward a predetermined distance to a next location on the magnetic tape in response to detecting a data writing error. Further, the information handling system may include a tape drive wherein the tape head, the error detection module, and the tape advancement module may be configured to cooperate to repeat the functions of advancing the magnetic tape a predetermined distance, attempting to write data to the magnetic tape, and determining if the attempted data write was successful following each unsuccessful data writing attempt.

BRIEF DESCRIPTION OF THE DRAWINGS

A more complete understanding of the present embodiments and the advantages thereof may be acquired by referring to the following descriptions taken in conjunction with the accompanying drawings, in which like reference numbers indicate like features; and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
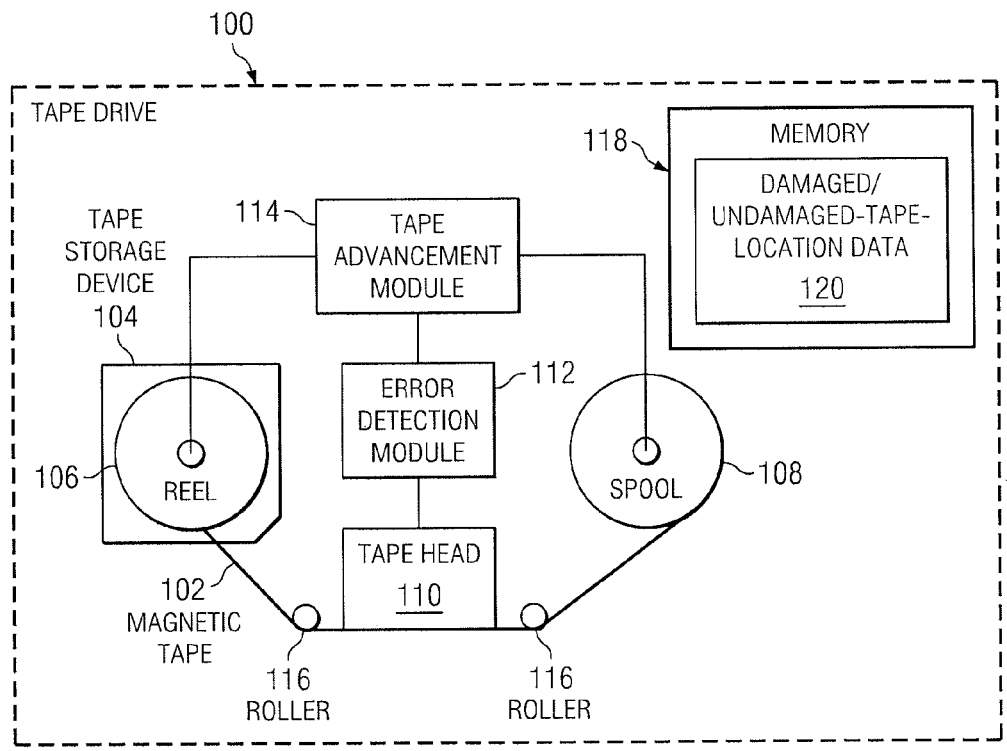
FIG. 1 illustrates an example tape drive device for using magnetic tape having damaged areas, in accordance with certain embodiments of the present disclosure.

FIG. 1 illustrates an example tape drive device 100 for using a magnetic tape 102 having damaged areas, in accordance with certain embodiment of the present disclosure.

Tape drive 100 may include a magnetic tape 102, a tape storage device 104, a reel 106, a spool 108, a tape head 110, an error detection module 112, a tape advancement module 114, rollers 116, a memory 118, and damaged/undamaged-tape-location data 120. Tape drive 100 may be generally configured to write data to and/or read data from magnetic tape 102.

Tape storage device 104 may house magnetic tape 102. For example, tape storage device 104 housing may include a Linear Tape-Open (LTO) cartridge or the like.

In some embodiments, reel 106 may be housed in tape storage device 104. Tape drive 100 may be configured to transfer magnetic tape 102 from reel 106 onto spool 108 in a forward direction and/or from spool 108 onto reel 106 in a reverse direction. A leader pin that interlocks with a leader block within tape storage device 104 may pull magnetic tape 102 from the cartridge.

Tape head 110 may comprise one or more head elements, e.g., a read head element and/or a write head element. In some embodiments, tape head 110 may comprise a write head element that spatially precedes a read head element in relation to the linear-forward-flow direction of magnetic tape 102 advancement. Tape head 110 may be configured to write data to magnetic tape 102.

Error detection module 112 may be configured to detect data writing errors at various locations on magnetic tape 102.

Tape advancement module 114 may be configured to control movement and advancement of the tape 102. Magnetic tape 102 may move linearly past the surface of tape head 110. Tape advancement module 114 may advance tape 102 by rotating either reel 106, spool 108, or both. Rollers 116 may guide magnetic tape 102, keeping magnetic tape 102 in contact with tape head 110.

Each module 112, 114 may include any software, firmware, or hardware necessary to perform associated operations, functions, and tasks. For example, each module 112, 114 may include software, firmware, or logic stored on computer-readable media.

Memory 118 may be configured to store tape location data 120. Tape location data 120 may include data indicating physical locations on magnetic tape 102 where a write error was detected and/or data indicating physical locations on magnetic tape 102 where data writing was successful.

In operation, error detection module 112 may be configured to detect data writing errors at various locations on magnetic tape 102. In some embodiments, error detection module 112 may detect data writing errors by comparing the data intended to be written to magnetic tape 102 with the data actually written to magnetic tape 102 by tape head 110. For example, a read head element of tape head 110 may read data written to magnetic tape 102 by a write head element of tape head 110, and error detection module 112 may use this read data as the actual data written to magnetic tape 102 for comparison purposes.

In certain embodiments, error detection module 112 may perform a Cyclic Redundancy Check (CRC) for detecting a data write error. A CRC may include taking a data stream as input and outputting a value of a certain fixed size. The CRC may be used as a checksum or redundancy check to detect alterations of data during transmission or storage.

In some embodiments, error detection module 112 may include a Viterbi Detector to sample data tracks to assist in detecting a data write error. For example, a Viterbi Detector may include a Viterbi algorithm that may include dynamic programming for finding the most likely sequence of hidden states that result in a sequence of observed events. The Viterbi algorithm may include a closely related algorithm for computing the probability of a sequence of observed events.

In response to error detection module 112 detecting a write error, tape advancement module 114 may be configured to interrupt data writing and advance tape 102 forward a predetermined distance, such that data writing may be resumed (or at least attempted) at an advanced location on tape 102. In some embodiments, the distance tape 102 is advanced may be programmable into tape drive 100. For example, the advancement distance may be programmable into tape drive 100 firmware or software.

In certain embodiments, tape advancement module 114 may include servo elements and routines for monitoring and controlling the advancement of magnetic tape 102 in response to errors detected by error detection module 112. For example, tape advancement module 114 servo may include a linear servo element located in tape head 110. Tape advancement module 114 servo may use the linear servo element to track spool 108, including the advancement speed and/or the reading and writing speeds of magnetic tape 102.

Furthermore, tape advancement module 114 servo may be configured to process magnetic tape 102. Tape 102 processing may include, e.g., controlling track information on magnetic tape 102, writing servo track information to magnetic tape 102, and reading servo track information on magnetic tape.

Tape advancement module 114 servo, in coordination with tape head 110, may write and read servo tracks on magnetic tape 102, indicating where damaged and undamaged portions of tape 102 are located. In some embodiments, tape advancement module 114 servo may use servo tracks to move directly to portions of tape 102 where error detection module 112 has determined tape 102 is undamaged or where data has been written to magnetic tape 102.

Tape head 110 may attempt to write data at advanced locations on magnetic tape 102 and error detection module 112 may determine the success of attempts to write data at advanced locations on tape 102.

Tape advancement module 114, tape head 110, and error detection module 112 may cooperate to repeat the functions of advancing magnetic tape 102 a predetermined distance, attempting to write data to magnetic tape 102, and determining if the attempted data write was successful following each unsuccessful data writing attempt. Tape head 110 may continue to write data to magnetic tape 102 at an undamaged location after determining that an attempted data write was successful.

Tape head 110, error detection module 112, and tape advancement module 114 may cooperate to record and/or store tape location data 120 in memory 118. In some embodiments, tape location data 120 is generated based on physical locations on magnetic tape 102 where error detection module 112 determined that a writing error occurred (damaged-tape location data), or where data writing either was not interrupted or was determined to be successful and resumed at an advanced location on tape 102 (undamaged-tape location data).

In certain embodiments, tape head 110, error detection module 112, and/or tape advancement module 116 may cooperate with memory 118 to access and/or read damaged/undamaged-tape-location data 120, and/or use damaged and/or undamaged tape location data 120 to automatically skip damaged areas of magnetic tape 102.

Storage device 104 may be configured to identify various locations on magnetic tape 102 where a data writing error were detected. Furthermore, in some embodiments, storage device 104 may be configured to identify locations on magnetic tape 102 where no data writing error was detected and where data writing resumed.

Tape advancement module 114 may be configured to skip over damaged portions of the magnetic tape 102 based on data stored in storage device 104, data stored directly on magnetic tape 102, and/or damaged/undamaged-tape-location data 120 stored in memory 120.

Figure 2:
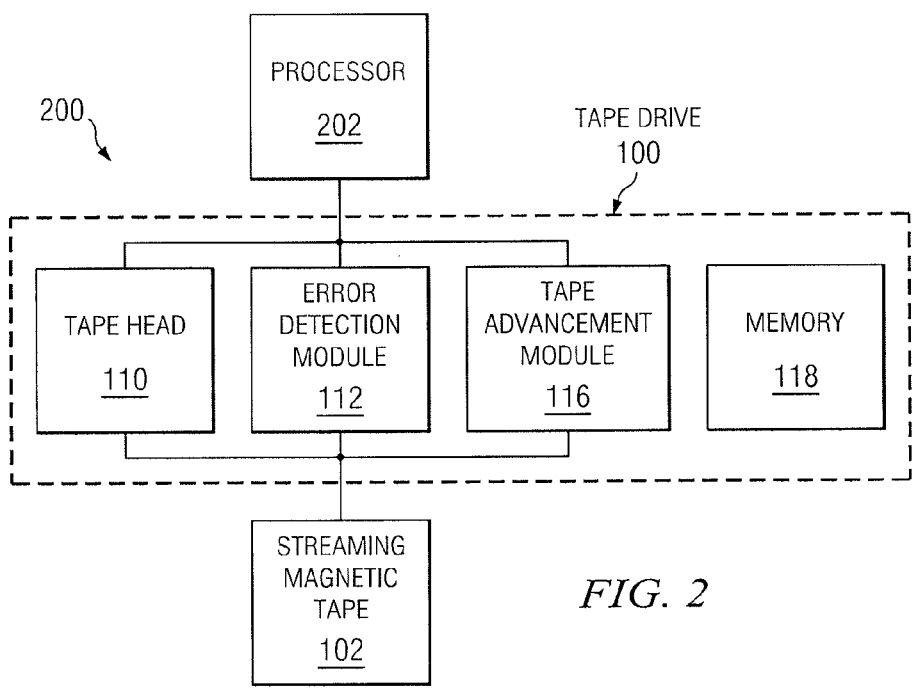
FIG. 2 illustrates a block diagram of an example information handling system for using magnetic tape having damaged areas, in accordance with certain embodiments of the present disclosure.

FIG. 2 illustrates a block diagram of an example information handling system 200 for using magnetic tape 102 having damaged areas, in accordance with certain embodiment of the present disclosure.

Information handling system 200 includes one or more tape drives 100 communicatively coupled to one or more processors 202. Each processor 202 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data.

Each tape drive 100 may include a tape head 110 configured to write data to streaming magnetic tape 102, an error detection module 112 configured to detect a data writing error at a first location, a tape advancement module 114 configured to interrupt data writing and advance tape 102 forward a predetermined distance to a next location on magnetic tape 102 in response to detecting a data writing error, and memory 118 configured to store damaged/undamaged-tape-location data 120.

In operation, tape head 110 may attempt to write data at the next location on the magnetic tape 102 and error detection module 112 may be configured to determine if the attempted data write was successful.

Tape advancement module 114, tape head 110, and error detection module 112 may cooperate to repeat the functions of advancing magnetic tape 102 a predetermined distance, attempting to write data to magnetic tape 102, and determining if the attempted data write was successful following each unsuccessful data writing attempt. Tape head 110 may then continue to write data to magnetic tape 102 after determining that an attempted data write was successful.

Tape head 110, error detection module 112, and/or tape advancement module 116 may cooperate with memory 118 to store, access, and read damaged/undamaged-tape-location data 120, and/or use damaged/undamaged-tape-location data 120 to skip over damaged areas of magnetic tape 102.

Figure 3:
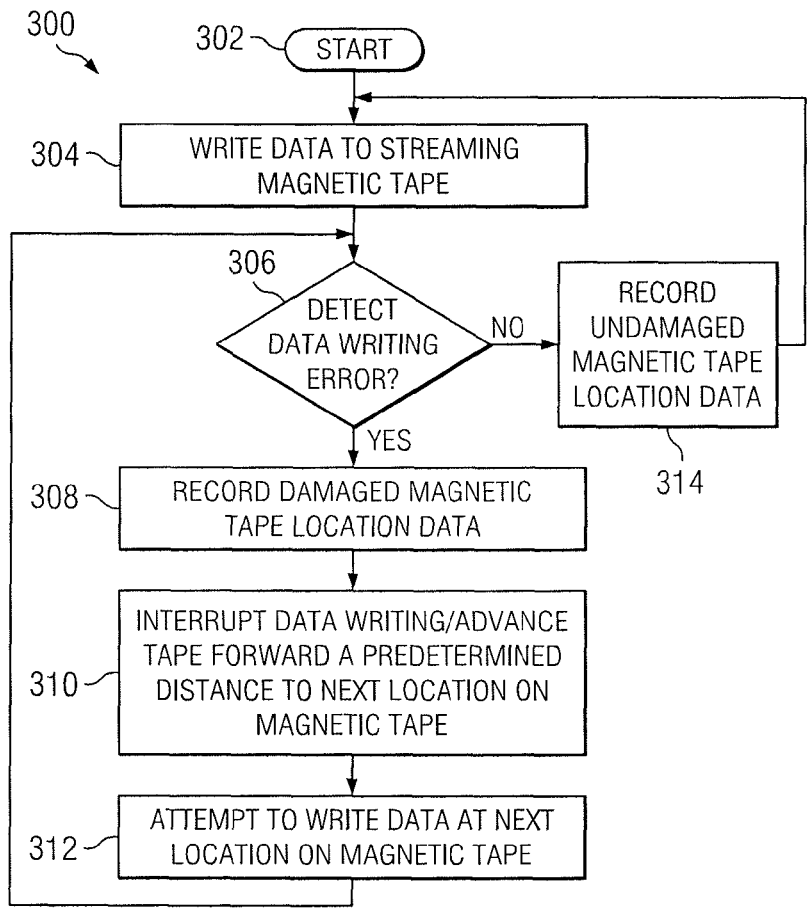
FIG. 3 illustrates a flow chart of an example method for using magnetic tape having damaged areas, in accordance with certain embodiments of the present disclosure.

FIG. 3 illustrates a flow chart of an example method 300 for using magnetic tape 102 having damaged areas, in accordance with certain embodiments of the present disclosure.

According to some embodiments, method 300 may begin at step 302. Teachings of the present disclosure may be implemented in a variety of configurations of systems, including configurations of information handling system 200. As such, the preferred initialization point for method 300 and the order of the steps 302-314 comprising method 300 may depend on the implementation chosen.

At step 304, information handling system 200 may write data to streaming magnetic tape 102.

At step 306, information handling system 200 may detect a data writing error. In certain embodiments, detecting a data writing error on magnetic tape 102 at step 306 may include performing a Cyclic Redundancy Check (CRC).

As long as a data writing error is not detected, information handling system 200 may record undamaged tape location data at step 314 and write data to streaming magnetic tape 102 at step 304. In some embodiments, undamaged magnetic tape location data 120 may be recorded to memory 118 at step 314.

If a writing error is detected at step 306, at step 308, information handling system 200 may record damaged magnetic tape location data. In some embodiments, damaged magnetic tape location data 120 may be recorded to memory 118 at step 308.

At step 310, information handling system 200 may interrupt data writing and advance tape 102 forward a predetermined distance to a next location on magnetic tape 102. In some embodiments, monitoring and controlling magnetic tape 102 advancement forward a predetermined distance at step 310 may include using a linear servo.

At step 312, information handling system 200 may attempt to write data at the advanced location on magnetic tape 102. Information handling system 200 may make one or multiple attempts to write data at this advanced location.

After attempting to write data to streaming magnetic tape 102 at the advanced location on magnetic tape 102 at step 312, the method may return to step 306 to determine if the attempted data write was successful. In some embodiments, error detection at step 306 may include using a Viterbi detector to sample data tracks written to magnetic tape 102.

If a data writing error is detected at step 306, information handling system 200 may repeat the above steps 308-312. This process may be repeated, each time advancing to a further location on tape 102, until information handling system 200 does not detect a data writing error at step 306, at which point information handling system 200 may record undamaged magnetic tape location data at step 314 and continue to write data to streaming magnetic tape 102 at step 304.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 200 or any other system operable to implement method 300. In certain embodiments, method 300 may be implemented partially or fully in firmware and/or software embodied in computer-readable media.

Figure 4:
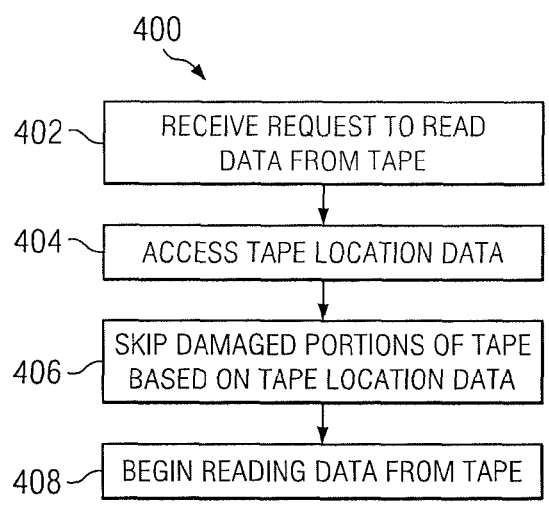
FIG. 4 illustrates a flow chart of an example method for accessing tape location data and using such data to skip damaged areas of magnetic tape, in accordance with certain embodiments of the present disclosure.

FIG. 4 illustrates a flow chart of an example method 400 for accessing tape location data 120 and using such data 120 to skip damaged areas of magnetic tape 102, in accordance with certain embodiments of the present disclosure.

Teachings of the present disclosure may be implemented in a variety of configurations of systems, including configurations of information handling system 200. As such, the preferred initialization point for method 400 and the order of the steps 402-408 comprising method 400 may depend on the implementation chosen.

At step 402, information handling system 200 may receive a request to read data from magnetic tape 102.

At step 404, information handling system 200 may access tape location data 120. In some embodiments, tape location data 120 is accessed from memory 118.

At step 406, information handling system 200 may skip past damaged portions of tape 102 based on the accessed tape location data 120.

At step 408, information handling system 200 may begin reading data from tape 102 after skipping past damaged portions.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using information handling system 400 or any other system operable to implement method 400. In certain embodiments, method 400 may be implemented partially or fully in firmware and/or software embodied in computer-readable media.

Using the methods, systems, and devices disclosed herein, disadvantages and problems associated with writing data to magnetic tape 102 having damaged areas may be substantially reduced or eliminated. For example, the methods, systems, and devices disclosed herein may provide the ability to continue to advance magnetic tape 102 forward predetermined distances in response to writing errors until undamaged portions of tape 102 are located, thus allowing for data writing to continue and avoiding the results of conventional approaches in which partially damaged magnetic tapes are rendered unusable and discarded after a writing error.

Although the present disclosure has been described in detail, it should be understood that various changes, substitutions, and alterations can be made hereto without departing from the spirit and the scope of the disclosure as defined by the appended claims.

What is claimed is:

1. A method for using a magnetic tape having one or more damaged areas, the method comprising:
    reading data from a portion of a magnetic tape;
    accessing tape location data indicating that the portion of the magnetic tape includes at least one of a damaged area and an undamaged area;
    interrupting reading data from the portion of the magnetic tape if the tape location data indicates that the portion of the magnetic tape includes the damaged area such that data stored on the damaged area of the magnetic tape is not detected; and
    advancing the magnetic tape forward based on the tape location data to skip the damaged area in response to interrupting reading data from the portion of the magnetic tape.

2. The method of claim 1, further comprising resuming reading data from the portion of the magnetic tape after skipping the damaged area if the tape location data indicates that the portion of the magnetic tape includes the undamaged area.

3. The method of claim 1, wherein the tape location data indicates the undamaged area based on data being successfully written to the undamaged area.

4. The method of claim 1, wherein the tape location data indicates the damaged area based on a write error associated with the damaged area.

5. The method of claim 4, wherein the write error is detected by performing a Cyclic Redundancy Check.

6. The method of claim 1, wherein the tape location data indicates the damaged area based on an unsuccessful attempt to write data to the damaged area.

7. A tape drive for reading data from a magnetic tape comprising;
    a read head configured to:
        read data from a portion of a magnetic tape; and
        interrupt reading data from the portion of the magnetic tape if tape location data indicates that the portion of the magnetic tape includes a damaged area such that data stored on the damaged area of the magnetic tape is not detected by the read head; and a tape advancement module associated with the read head and configured to advance the magnetic tape forward in response to the read head interrupting reading data from the portion of the magnetic tape in order to move the damaged area past the read head if the tape location data indicates that the portion of the magnetic tape includes the damaged area.

8. The tape drive of claim 7, wherein the read head is further configured to resume reading data from the portion of the magnetic tape in response to the tape advancement module advancing the magnetic tape forward if the tape location data indicates that the portion of the magnetic tape includes an undamaged area.

9. The tape drive of claim 7, further comprising an error detection module associated with the read head and the tape advancement module and configured to:
   detect a successful data write associated with the portion of the magnetic tape; and
   generate the tape location data indicating that the portion of the magnetic tape includes the undamaged area based on the successful data write.

10. The tape drive of claim 7, further comprising an error detection module associated with the read head and the tape advancement module and configured to:
   detect a write error associated with the portion of the magnetic tape; and
   generate the tape location data indicating that the portion of the magnetic tape includes the damaged area based on the unsuccessful data write.

11. The tape drive of claim 10, wherein the error detection module comprises a Viterbi Detector configured to sample data tracks and detect the write error according to the sampled data tracks.

12. The tape drive of claim 10, wherein the error detection module is configured to detect the write error by performing a Cyclic Redundancy Check.

13. The tape drive of claim 7, wherein the tape advancement module includes a linear servo for advancing the magnetic tape forward.

14. An information handling system comprising:
   a processor;
   a storage resource communicatively coupled to the processor and configured to store tape location data indicating that a portion of a magnetic tape includes at least one of a damaged area and an undamaged area;
   a read head communicatively coupled to the processor and configured to:
      read data from the portion of the magnetic tape;
      receive instructions from the processor to interrupt reading data if the tape location data indicates that the portion of the magnetic tape includes the damaged area; and
      interrupt reading data from the portion of the magnetic tape in response to receiving the instructions to interrupt reading data such that data stored on the damaged area of the magnetic tape is not detected by the read head; and
   a tape advancement module communicatively coupled to the processor and configured to:
      receive instructions from the processor to advance the magnetic tape forward if the tape location data indicates that the portion of the magnetic tape includes the damaged area; and
      advance the magnetic tape forward to move the damaged area past the read head in response to the read head interrupting reading data from the portion of the magnetic tape and receiving the instructions to advance the magnetic tape forward.

15. The information handling system of claim 14, wherein the read head is further configured to:
   receive instructions from the processor to resume reading data from the portion of the magnetic tape in response to the tape advancement module advancing the magnetic tape forward if the tape location data indicates that the portion of the magnetic tape includes an undamaged area; and
   resume reading data from the portion of the magnetic tape in response to receiving the instructions to resume reading data from the portion of the magnetic tape.

16. The information handling system of claim 14, further comprising an error detection module associated with the storage resource and configured to:
   detect a successful data write associated with the portion of the magnetic tape; and
   generate the tape location data indicating that the portion of the magnetic tape includes the undamaged area based on the successful data write.

17. The information handling system of claim 14, further comprising an error detection module associated with the storage resource and configured to:
   detect a write error associated with the portion of the magnetic tape; and
   generate the tape location data indicating that the portion of the magnetic tape includes the damaged area based on the unsuccessful data write.

18. The information handling system of claim 17, wherein the error detection module comprises a Viterbi Detector configured to sample data tracks and detect the write error according to the sampled data tracks.

19. The information handling system of claim 17, wherein the error detection module is configured to detect the write error by performing a Cyclic Redundancy Check.

20. The information handling system of claim 14, wherein the tape advancement module includes a linear servo for advancing the magnetic tape forward.

* * * * *